United States Patent [19]

Dunchock

[11] 4,256,340
[45] Mar. 17, 1981

[54] LOCKABLE STORAGE COMPARTMENT AND SEAT FOR VEHICLES

[75] Inventor: Richard S. Dunchock, Farmington Hills, Mich.

[73] Assignee: SL Container Corporation, Southfield, Mich.

[21] Appl. No.: 52,024

[22] Filed: Jun. 25, 1979

[51] Int. Cl.³ .................................................. B60P 3/05
[52] U.S. Cl. ................................ 296/24 R; 296/37.15; 312/235 R
[58] Field of Search ............... 296/37.14, 37.15, 37.16, 296/24 R; 297/193; 312/235 R, 235 A

[56] References Cited

U.S. PATENT DOCUMENTS

| | | | |
|---|---|---|---|
| 1,404,484 | 1/1922 | Schoonmaker | 296/37.15 |
| 2,934,374 | 4/1960 | Mortenson | 296/37.16 |
| 3,291,520 | 12/1966 | Smith | 296/24 |
| 3,326,596 | 6/1967 | LaSpina | 296/37.16 |
| 3,909,060 | 9/1975 | Katayama | 296/37.16 |
| 3,990,322 | 11/1976 | Hoffmann | 296/37.16 |

*Primary Examiner*—John J. Love
*Assistant Examiner*—John A. Carroll
*Attorney, Agent, or Firm*—Basile, Weintraub & Hanlon

[57] ABSTRACT

A lockable storage compartment and seat for vehicles is disclosed. The storage compartment and seat of the present invention comprises a compartment with a lockable cover having a form which complies with a luggage compartment disposed behind the front seats of a vehicle. The cover is movable from a first position enclosing the storage compartment to a second position wherein access to the storage compartment is provided. When in the first position the cover serves as a seat.

4 Claims, 7 Drawing Figures

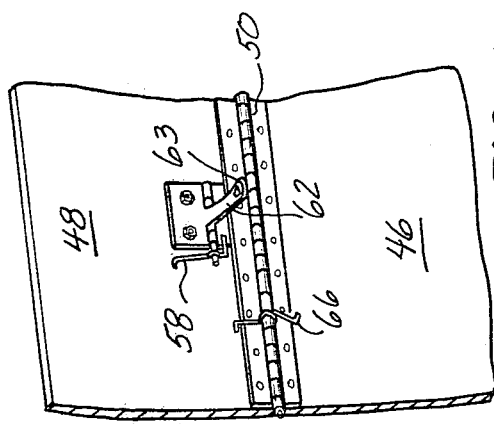
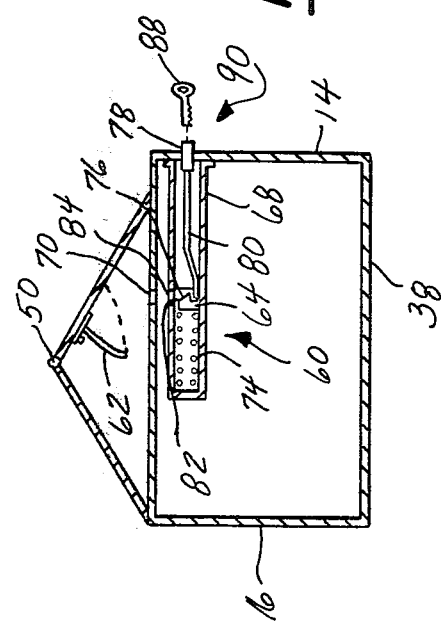
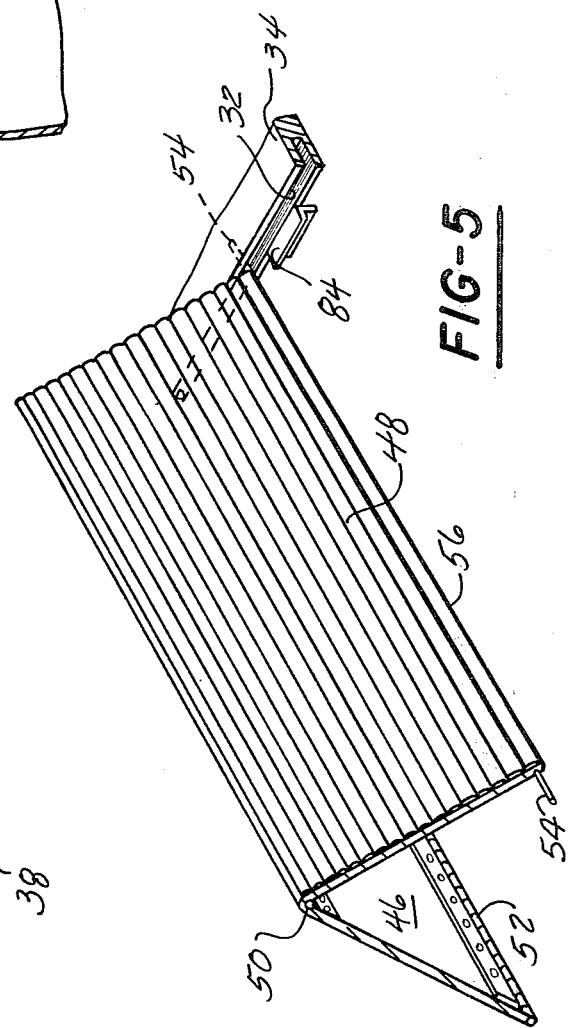

LOCKABLE STORAGE COMPARTMENT AND SEAT FOR VEHICLES

BACKGROUND OF THE INVENTION

I. Field of the Invention

The present invention relates to the field of storage compartments for vehicles. More particularly, the present invention relates to the field of storage compartments for vehicles of the two passenger variety such as the Mercedes Benz two seater roadster having a luggage compartment disposed behind the seats. Even more particularly, the present invention relates to the field of lockable storage compartments disposed behind the seats of a two seated vehicle, a cover of the storage compartment serving as a seat when the cover is in a locked position.

II. Cross Reference to Related Applications

This application is related to copending design patent application Ser. No. 057,366, filed July 13, 1979, entitled STORAGE COMPARTMENT FOR AN AUTOMOBILE

III. Description of the Prior Art

Storage compartments for vehicles have long been known. A search of the issued U.S. patents reveals the following patents relating to storage compartments for vehicles.

U.S. Pat. No. 2,934,374 discloses an auxiliary storage compartment for vehicles of the two seat variety, the storage compartment comprising a box having a pair of hinged covers which completely fills the storage or luggage compartment behind the front seats of the vehicle.

U.S. Pat. No. 3,291,520 discloses a storage compartment with a removable cover therefore for installation in station wagon vehicles.

U.S. Pat. No. 3,326,596 discloses a storage compartment for installation behind the front seat of a vehicle, the compartment covering the space behind the seats.

U.S. Pat. No. 3,909,060 discloses an opaque cover for the storage area of automobiles so constructed and arranged that the cover automatically raises with the car lid covering the storage area to expose such areas. This invention is particularly adaptable to the hatch back type of vehicles.

U.S. Pat. No. 3,990,322 discloses a hand brake arrangement for motor vehicles with a storage tray arranged between the front seats of the vehicle. The storage tray is arranged over the tunnel provided to cover the drive shaft of the vehicle.

None of the above listed U.S. patents disclose or anticipate a lockable storage compartment configured to be installed in the luggage compartment behind the seats of a two seated vehicle, the cover of the compartment serving as a seat when the cover of the compartment is in a closed position.

SUMMARY OF THE INVENTION

The present invention comprises a lockable storage compartment and seat for a motor vehicle of the type having a drivers seat, a passenger seat adjacent the drivers seat and a luggage compartment disposed rearward of the seats. The lockable storage compartment and seat has a form which complies with the luggage compartment and is insertable therein. The storage compartment includes a folding cover for enclosing the storage compartment, the cover is movable from a closed position wherein the compartment is locked and the cover serves as a seat, to an open position wherein access to the storage compartment is provided.

The storage compartment comprises a boxlike structure with an open top including a vertical front wall disposed a distance rearward of a rear edge of the seats to provide leg room. A bottom edge of the front wall is contoured to abut a bottom wall of the luggage compartment. A rear wall of the compartment is disposed adjacent a rear wall of the luggage compartment and positioned parallel to the front wall. Both the front and rear walls extend transversely across the luggage compartment. A pair of opposed end walls extend between the front and rear walls to enclose the ends of the compartment. An outer surface of the end walls has an irregular shape conforming to the luggage compartment side walls.

One or more hollow compartment dividers are positioned perpendicular to the front and rear walls and extend between the walls to divide the storage compartment into a plurality of compartments. A compartment top wall extends between sides of the compartment divider and is positioned flush with a top edge of the front wall which provides support for the cover when it is positioned in the closed position.

The storage compartment folding seat comprises a pair of panels joined together by a first hinge. The panels are movable from a first position wherein the panels extend from the front wall to the rear wall and between end walls to enclose the compartment and form a seat, to a second position wherein the panels are hinged together opening the compartment. A torsion spring is affixed to the first hinge biasing the panels to the second position. A lock means is provided for locking the panels in the first position, and when the lock means is released the hinged panels move toward the second position.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings like reference numbers refer to like parts throughout the several views, and wherein:

FIG. 3 illustrates a cross-sectional view of the storage compartment taken along the lines 3—3 of FIG. 2;

FIG. 5 illustrates a broken perspective view of the seat of the present invention partially opened;

FIG. 6 illustrates a broken perspective view of the hinged lock bar of the present invention and its biasing means.

DESCRIPTION OF THE PREFERRED EMBODIMENT

In motor vehicles of the type having a drivers seat, a passenger seat adjacent the drivers seat and a luggage compartment 10 disposed rearward of the seats, it is often desirable to have a means for enclosing and locking valuables stored in the luggage compartment. It is also often desired to carry passengers such as small children in the luggage compartment, and a seat for the extra passengers comfort is needed. The storage compartment and seat of the present invention is designed to accomplish these desired objectives in a vehicle such as the Mercedes Benz two seat roadster.

Figure 1:
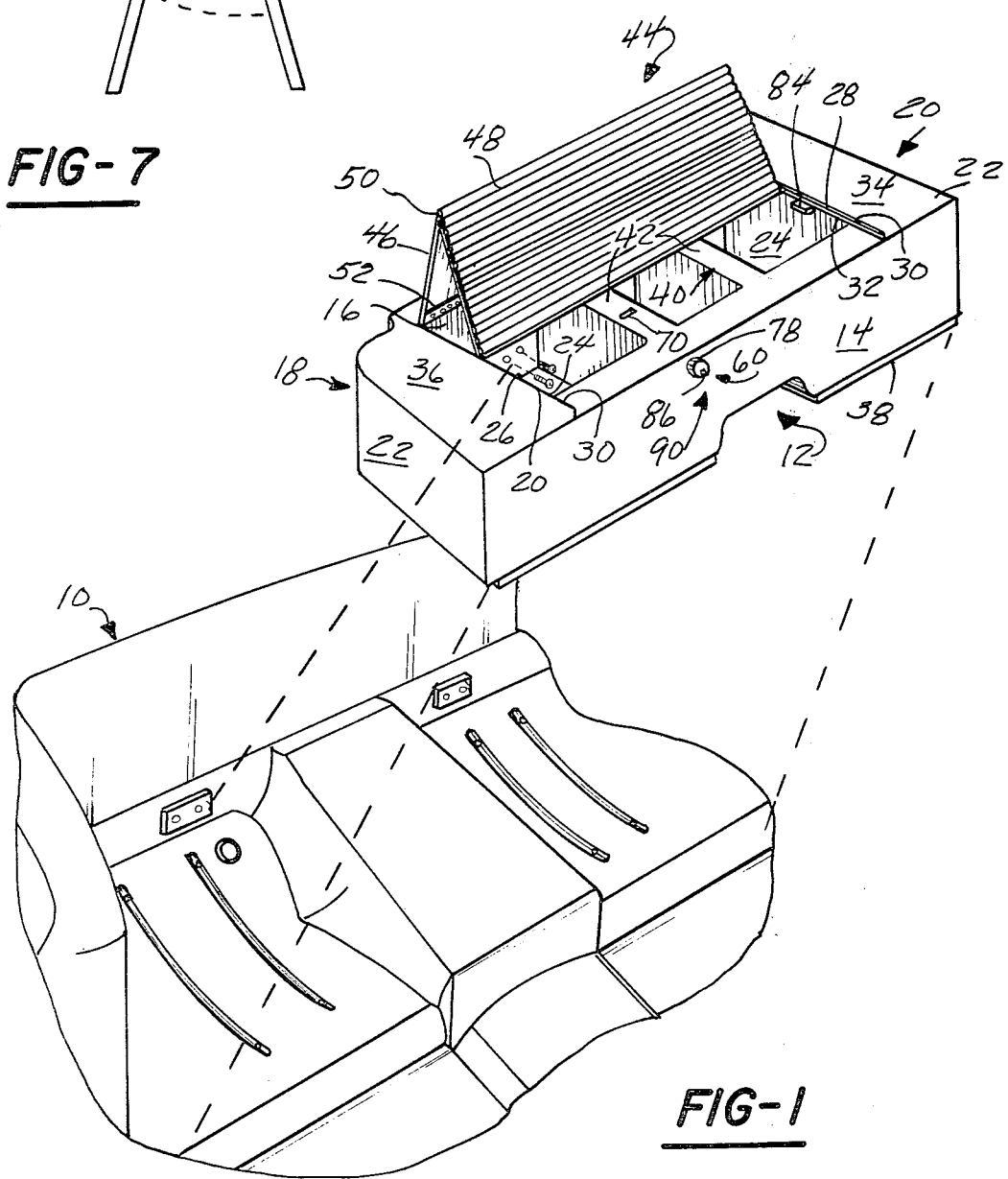
FIG. 1 illustrates a broken exploded perspective view of the storage compartment and seat of the present invention.
Figure 2:
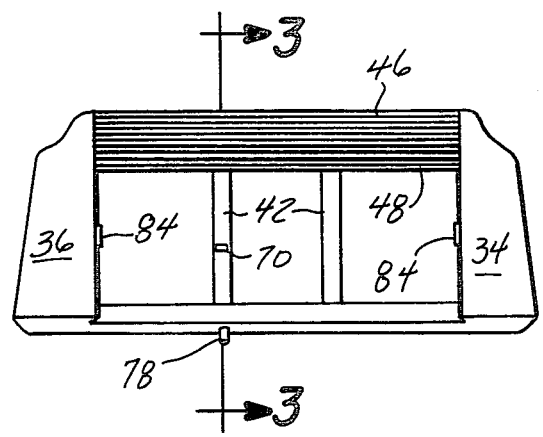
FIG. 2 illustrates a top view of the storage compartment of the present invention.
Figure 4:
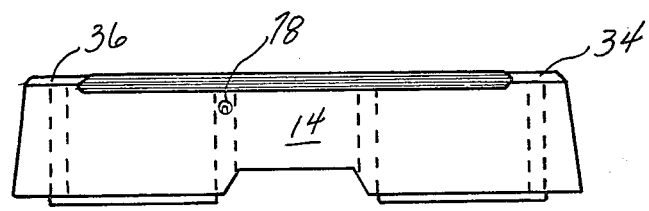
FIG. 4 illustrates a front view of the storage compartment of the present invention.

As shown in FIGS. 1, 2 and 4, the storage compartment and seat 12 of the present invention comprises a compartment formed by a vertical front wall 14 disposed a distance rearward of a rear edge of the seats to provide leg room; an opening extending upward from a lower edge thereof to clear a drive shaft tunnel, with the front wall 14 extending transversely across the luggage compartment; a rear wall 16 adjacent a rear wall of the luggage compartment disposed parallel to the front wall, and extending transversely across the luggage compartment. A pair of opposed end walls 18, 20 extend between the front and rear walls to form an enclosed boxlike structure with an open top. An outer surface 22 of the end walls has an irregular shape which conforms to the luggage compartment side wall, and an inner surface 24 of the end walls is spaced inward of the outer surface and extends perpendicularly between the front and rear walls with a top edge flush with a top edge of the front wall. A pair of opposed projections 26, 28 extend above the top edge of the inner surface and spaced outward a distance therefrom to form a ledge 30 along the top edge of the inner surface. The projections 26, 28 extend between the front and rear walls 14 and 16. Tracks 32 are formed along an inner edge of the projections and extend from the front wall to the rear wall. The function of the tracks 32 will be explained more fully hereinbelow. A pair of opposed top walls 34, 36 extend from the inner surface to the outer surface and from the front wall to the rear wall to enclose an end portion of the compartment 12. A bottom wall 38 extends between the lower edges of the outer surfaces and from a lower edge of the front wall to a lower edge of the rear wall along the vehicle floor. The bottom wall 38 conforms to the contour of the vehicle floor to enclose the storage compartment bottom.

One or more hollow compartment dividers 40 extend between the front and rear walls perpendicular thereto. A compartment divider top wall 42 extends between sides of the compartment divider 40 and is positioned flush with the top edge of the front wall providing support for a seat panel when it is in a first position as will be described more fully hereinbelow.

Figure 7:
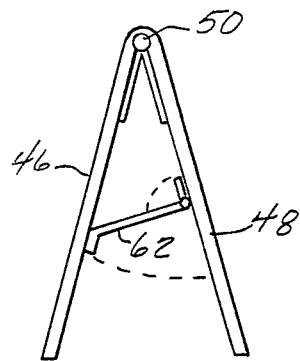
FIG. 7 illustrates a side view of the hinged lock bar illustrating how the hinged lock bar is folded against its biasing means as the panels of the seat are folded together.

As shown in FIG. 1, and in greater detail in FIGS. 5, 6 and 7, the storage compartment seat 44 comprises a pair of panels 46, 48 joined together by a first hinge 50. The panels are movable from a first position wherein the panels extend from the front wall to the rear wall and between projections enclosing the compartment 12 forming a seat of planar configuration, to a second position wherein the panels are hinged together opening the compartment. A second hinge 52 hinges a rear edge of the panel to a top edge of the rear wall. A pair of opposed rods 54 project transversely from a forward edge of the panel 48 to engage the tracks 32, the rods are slidable along the tracks 32.

A torsion spring 66 next to the first hinge 50 biases the panels to the second position.

A lock means 60 is provided for locking the panels in the first position. The lock means includes a downward extending hinged lock bar 62 hinged to a panel and biased to engage a latch when the panels are moved to the first position. The lock bar 62 hinges against a bias means 58 to clear the adjacent panel 46 when the seat is moved to the second position and the panels are folded together as shown in FIG. 7.

As shown in FIG. 3, the lock means 60 comprises a lock housing 68 disposed between the sides of the hollow compartment divider 40 and a latch 64 supported by the housing and movable therewithin between a first position holding the lock bar 62 in a first position to a second position releasing the lock bar 62 and allowing the seat to be moved to the second position. An opening 70 is formed in the divider top wall which is configured to receive the downward extending lock bar 62. A lock housing opening 82 allows the lock bar 62 to reach the latch 64. The latch 64 is positioned to engage the lock bar 62 when it is moved to the first position. An opening 63, FIG. 6, formed in the lock bar is configured to releasably engage the latch. The latch 64 is biased to the first position by means of a spring 74 with one end of the spring abutting the housing and another end of the spring abutting the latch. The latch 64 is movable within the housing 68 by either the lock bar abutting and sliding against a ram 76 along the latch, or by a push button 78 projecting through an opening formed in the front wall 14. The push button 78 when depressed urges the latch 64 against the spring 74 by means of an actuator rod 80 extending between the push button 78 and the latch 64. When the push button 78 is depressed the latch releases the lock bar 62 allowing the seat to be moved to the second position. The pair of opposed rods 54 are slid rearward along the tracks 32 to move the seat to the second open position.

To move the seat from the second or opened position to the first or closed position the forward edge 56 of the panel is urged forward, the rods 54 slide in the tracks 32, and as the seat approaches the first position the lock bar 62 enters the opening 70 and the opening 82. A forward edge of the lock bar 62 abuts a forward edge of the opening 82, and as the seat is latched to the first position the lock bar 62 moves along the ramp 76 urging the latch 64 against the spring 74. The opening 63 in the lock bar 62 engages the latch 64 latching the seat in the first position. When in the first position the panel 46, 48 rest on the ledge 30 and the compartment divider top wall 42 and a pair of brackets 84 affixed to the inner surfaces 24. The brackets 84 have a horizontal surface flush with the ledge 30 to aid in the support of the panels in the first position.

A key receiving opening 86 in the push button 78 is configured to receive a key 88 which rotates the push button 78 from a first position wherein the push button is depressable to release the latch to a second position wherein the push button 78 is locked against movement. The push button 78, the opening 86, and the key 88 cooperate to define a key rotatable lockable push button which in a first position is depressable to release the latch from engagement with the lock bar, and in a second position when the key is rotated the push button is locked against movement.

There has been described hereinabove a lockable storage compartment and seat with a form which complies with the luggage compartment disposed behind the seats of a two seated vehicle. The lockable storage compartment includes a cover movable from a closed position wherein the compartment is locked and the cover serves as a seat, to an open position wherein access to the storage compartment is provided. The cover serves as a seat for seating additional passengers as well as a means for enclosing and locking the storage compartment.

Having thus described my invention, what I claim is:

1. In a motor vehicle of the type having a drivers seat and a passenger seat adjacent the drivers seat, a luggage compartment disposed rearward of the seats, the seat backs hinged in a forward direction, a lockable storage compartment and seat having a form which complies with the luggage compartment insertable into the luggage compartment, the storage compartment comprising:
  a vertical front wall disposed a distance rearward of a rear edge of the seats to provide leg room;
  an opening extending upward from a lower edge thereof to clear a driveshaft tunnel, the front wall extending transversely across the luggage compartment;
  a rear wall adjacent a rear wall of the luggage compartment disposed parallel to the front wall, and extending transversely across the luggage compartment;
  a pair of opposed end walls extending between the front and rear walls, an outer surface of the ends walls having an irregular shape conforming to the luggage compartment side walls, an inner surface of the end walls spaced inward of the outer surface extending perpendicularly between the front and rear walls with a top edge flush with a top edge of the front wall, a pair of opposed projections extending above the top edge of the inner surface spaced outward a distance therefrom, the projections extending between the front and rear walls;
  tracks formed along an inner edge of the projections extending from the front wall to the rear wall;
  a pair of opposed padded top walls extending from the inner surface to the outer surface, and from the front wall to the rear wall;
  a bottom wall extending between lower edges of the outer surfaces and from the front wall to the rear wall, conforming to the contour of the vehicle floor to enclose the storage compartment bottom; and
  one or more hollow compartment dividers extending between the front and rear walls and perpendicular thereto, a compartment divider top wall extending between sides of the compartment divider and flush with the top edge of the front wall.

2. The storage compartment and seat as defined in claim 1 wherein the seat comprises:
  a pair of panels joined together by a first hinge, the panels movable from the first position wherein the panels extend from the front wall to the rear wall and between projections enclosing the compartment forming a seat, to a second position wherein the panels are hinged together opening the compartment;
  a second hinge hinges a rear edge of the panels to a top edge of the rear wall;
  a pair of opposed rods projecting transversely from a forward edge of the panels to engage the tracks, the rods slidable along the tracks;
  a torsion spring affixed to the first hinge biasing the panels to the second position;
  a lock means for locking the panels in the first position, said lock means including a downward extending hinged lock bar hinged to a panel and biased to engage a latch when the panels are moved to the first position, said lock means hinging against the bias to clear the adjacent panel when the seat is moved to the second position, said lock means further including a key rotatable lockable push button which in a first position is depressable to release the latch from engagement with the lock bar and in a second position when the key is rotated said key rotable lockable push button is locked against movement.

3. The storage compartment and seat as defined in claim 2 wherein the locking means comprises:
  a lock housing disposed between sides of the hollow compartment divider;
  an opening formed in the divider top wall configured to receive the downward extending lock bar;
  a latch movable within the housing between a first position holding the lock bar in a first position to a second position releasing the lock bar and allowing the seat to be moved to the second position;
  an opening formed in the lock bar configured to releasably engage the latch;
  a biasing means to bias the latch to the first position;
  a lockable push button to move the latch against the biasing means releasing the lock bar for movement of the seat to the second position; and
  a lock barrel including a key receiving means, said barrel rotatable by the key between a first position wherein the push button is depressable, and a second position wherein the push button is locked against movement.

4. A storage compartment cover and seat comprising:
  a pair of panels joined together by a first hinge, the panels movable between a first position wherein they extend from a front wall to a rear wall and between end walls of the compartment enclosing the compartment and forming a seat, to a second position where the panels are hinged together opening the compartment;
  a rear transverse edge of the panels hinged to a top edge of the rear wall;
  a pair of opposed rods projecting transversely outward from a forward edge of the panels to engage tracks formed in the side walls, the rods slidable along the tracks;
  a torsion spring affixed to the first hinge, said spring biasing the panels to the second position; and
  a lock means for locking the panels in the first position, said lock means including a downward extnding hinged lock bar hinged to one of the panels and biased to engage a latch of the lock when the panels are moved to the first position, said latch hinging against the bias to clear the adjacent panel when the cover is moved to the second position.

* * * * *